United States Patent
Lee et al.

(10) Patent No.: US 8,527,286 B2
(45) Date of Patent: Sep. 3, 2013

(54) SYSTEM FOR HANDLING SCHEDULED LENDING AND SELF-RETURNING OF ARTICLES TO WHICH RFID TAGS ARE ATTACHED

(75) Inventors: Jong Min Lee, Seongnam-si (KR); Geon Hee Han, Seoul-si (KR); Hee Sang Kim, Guri-si (KR)

(73) Assignee: Eco, Inc., Seoul-si (KR)

( * ) Notice: Subject to any disclaimer, the term of this patent is extended or adjusted under 35 U.S.C. 154(b) by 992 days.

(21) Appl. No.: 11/854,191

(22) Filed: Sep. 12, 2007

(65) Prior Publication Data

US 2008/0111691 A1    May 15, 2008

(30) Foreign Application Priority Data

Nov. 13, 2006 (KR) .......................... 10-2006-0111425

(51) Int. Cl.
    *G06Q 10/00* (2012.01)
(52) U.S. Cl.
    USPC ................ 705/1.1; 705/307; 725/1; 702/188; 194/205
(58) Field of Classification Search
    USPC .................. 705/1, 1.1; 194/205; 702/188
    See application file for complete search history.

(56) References Cited

U.S. PATENT DOCUMENTS

| | | | |
|---|---|---|---|
| 4,896,024 A * | 1/1990 | Morello et al. | 235/381 |
| 7,366,586 B2 * | 4/2008 | Kaplan et al. | 700/241 |
| 7,378,971 B2 * | 5/2008 | Andrechak et al. | 340/572.7 |
| 2001/0016800 A1 * | 8/2001 | Koh et al. | 702/188 |

FOREIGN PATENT DOCUMENTS

| | | |
|---|---|---|
| JP | 2002-358573 | 12/2002 |
| JP | 2003-044755 | 2/2003 |
| KR | 10 2004005284 | 6/2004 |
| KR | 10 2007000846 | 1/2007 |

* cited by examiner

*Primary Examiner* — Jami A Plucinski
*Assistant Examiner* — Fathi Abdelsalam
(74) *Attorney, Agent, or Firm* — Michael J. Striker

(57) ABSTRACT

Disclosed herein is a system for handling scheduled lending and self-returning of articles to which RFID tags are attached. The system includes a body. The body includes, on a front surface thereof, a display for displaying a method of using the system, handling processes, and processing results, a speaker, a receipt issuing unit, a manipulational information input unit, an external antenna for transmitting/receiving information to/from the RFID tags, and a plurality of article depositories having respective internal antennas for transmitting/receiving information to/from the RFID tags. The body includes, on the inside thereof, a reader for reading the information recorded in the RFID tags through the external antenna and the internal antennas, and a controller for comparing information, transmitted/received to/from the reader, with stored article management information, checking validity of deposit, lending, and returning of the articles, and operating locking units of the article depositories, the display, the speaker, and the receipt issuing unit.

3 Claims, 5 Drawing Sheets

SYSTEM FOR HANDLING SCHEDULED LENDING AND SELF-RETURNING OF ARTICLES TO WHICH RFID TAGS ARE ATTACHED

CROSS-REFERENCE TO A RELATED APPLICATION

The invention described and claimed hereinbelow is also described in Korean Patent Application 2006-0111425 filed on Nov. 13, 2006. This Korean Patent Application provides the basis for a claim of priority of invention under 35 U.S.C. 119(a)-(d).

BACKGROUND OF THE INVENTION

1. Field of the Invention

The present invention relates generally to a system for handling scheduled lending and self-returning of various kinds of articles to which respective RFID tags, each having a semiconductor memory device and its own antenna, are attached, such as a book, a material, a video tape, an audio tape, a Digital Versatile Disc (DVD), Compact Disc Read Only Memory (CD-ROM), a tool, a baby carriage, and a toy, and, more particularly, to a system for handling scheduled lending and self-returning of articles to which RFID tags are attached, which enables articles, scheduled to be lent, to be stored in article depositories after scheduling the articles to be lent from various kinds of article rental shops, such as a library, archives, a video/DVD rental shop, a baby carriage or toy rental shop, and a tool rental shop, enables the articles, scheduled to be lent, to be automatically lent to borrowers regardless of business hours in the unmanned state, and enables the lent articles to be returned in the unmanned state, thereby automatically performing the scheduled lending and self-returning of articles.

2. Description of the Related Art

Japanese Unexamined Patent Publication No. 2002-358573 discloses an electronic commerce system using electronic lockers, which distributes articles without directly delivering articles to customers by arranging manpower or performing physical delivery by mail or the like when the articles are sold or lent.

In the above-described system, a list of products, which are the objects to be sold and lent by registered traders, is transmitted to a customer terminal, transaction information regarding a product selected by a customer is acquired from the customer terminal, and an identification number to be utilized to provide the product is issued at the time of the transaction and is transmitted to an electronic locker and the customer terminal.

When the customer inputs the identification number to the electronic locker, an identification number stored for the product in the electronic locker is compared with the input identification number. If the two identification numbers coincide with each other, the electronic locker is unlocked.

Japanese Unexamined Patent Publication No. 2003-44755 discloses a system for receiving articles using article reception lockers, which enables a person, who cannot go shopping to a store during business hours, to receive a product, ordered over the Internet, etc., from a locker installed in a store, thereby enabling a user to purchase products at a low cost without worrying about the time of day.

The above-described system includes an order receiving and processing unit for checking whether a product and a locker are available when a store machine receives an order from a user terminal and for issuing an order number and a password and transmitting the issued order number and password to the user terminal and a locker controller if the product and the locker are available, and a locker management unit for managing the states of locker chambers of the reception locker and assigning a locker chamber to the ordered product.

Further, the locker controller stores the order number and the password while associating the order number and the password with the number of the locker in which the corresponding product is stored, compares an order number and a password input by a user with the stored order number and password, and unlocks a corresponding locker chamber when the order number and the password input by the user coincide with the stored order number and password.

In addition, Korean Unexamined Patent Publication No. 10-2004-0052847, the invention of which was invented by the present inventors, discloses a system for handling scheduled lending of articles, which enables a user to borrow an article scheduled to be lent in an unmanned manner from an article depository after scheduling the lending of the article.

In the above-described conventional systems, none of the locker, the locker chamber, and the article depository (hereinafter referred to as an "article depository") has a function of checking the validity of the deposit of an article in the article depository by itself. Therefore, there is a problem in that, if the operator of the article depositories mistakenly puts an article in the wrong article depository, all of the article depositories must be opened in order to find the article depository in which the corresponding article was placed in order to correct the mistake.

Further, there is another problem in that the system cannot be effectively utilized because the sold or lent article cannot be sent back or returned.

SUMMARY OF THE INVENTION

Accordingly, the present invention has been made keeping in mind the above-described problems occurring in the prior art, and an object of the present invention is to provide a system for handling scheduled lending and self-returning of articles to which RFID tags are attached, in which antennas for checking the RFID tags are provided in article depositories, so that the articles to which the RFID tags are attached can be accurately stored in corresponding article depositories, with the result that it is possible to prevent errors in article management and to perform scheduled lending and self-returning of the articles, thereby realizing excellent operational reliability and applicability.

In order to achieve the above object, the present invention provides a system for handling scheduled lending and self-returning of articles to which RFID tags are attached, including a body; the body including, on a front surface thereof, a display for displaying a method of using the system, handling processes, and processing results; a speaker; a receipt issuing unit; a manipulational information input unit, such as a keyboard; an external antenna for transmitting/receiving information to/from the RFID tags attached to the articles; and a plurality of article depositories having respective internal antennas for transmitting/receiving information to/from the RFID tags; and the body including, on the inside thereof, a reader for reading the information recorded in the RFID tags through the external antenna and the internal antennas; and a controller, such as a Personal Computer (PC), for comparing information, transmitted/received to/from the reader, with article management information stored in the database of a main computer installed in an article rental store, checking validity of deposit, lending, and returning of the articles, and operating locking units of the article depositories, the display, the speaker, and the receipt issuing unit.

BRIEF DESCRIPTION OF THE DRAWINGS

The above and other objects, features and other advantages of the present invention will be more clearly understood from the following detailed description, taken in conjunction with the accompanying drawings, in which.

DESCRIPTION OF THE PREFERRED EMBODIMENTS

The present invention will be described in detail with reference to the illustrated drawings.

Figure 1:
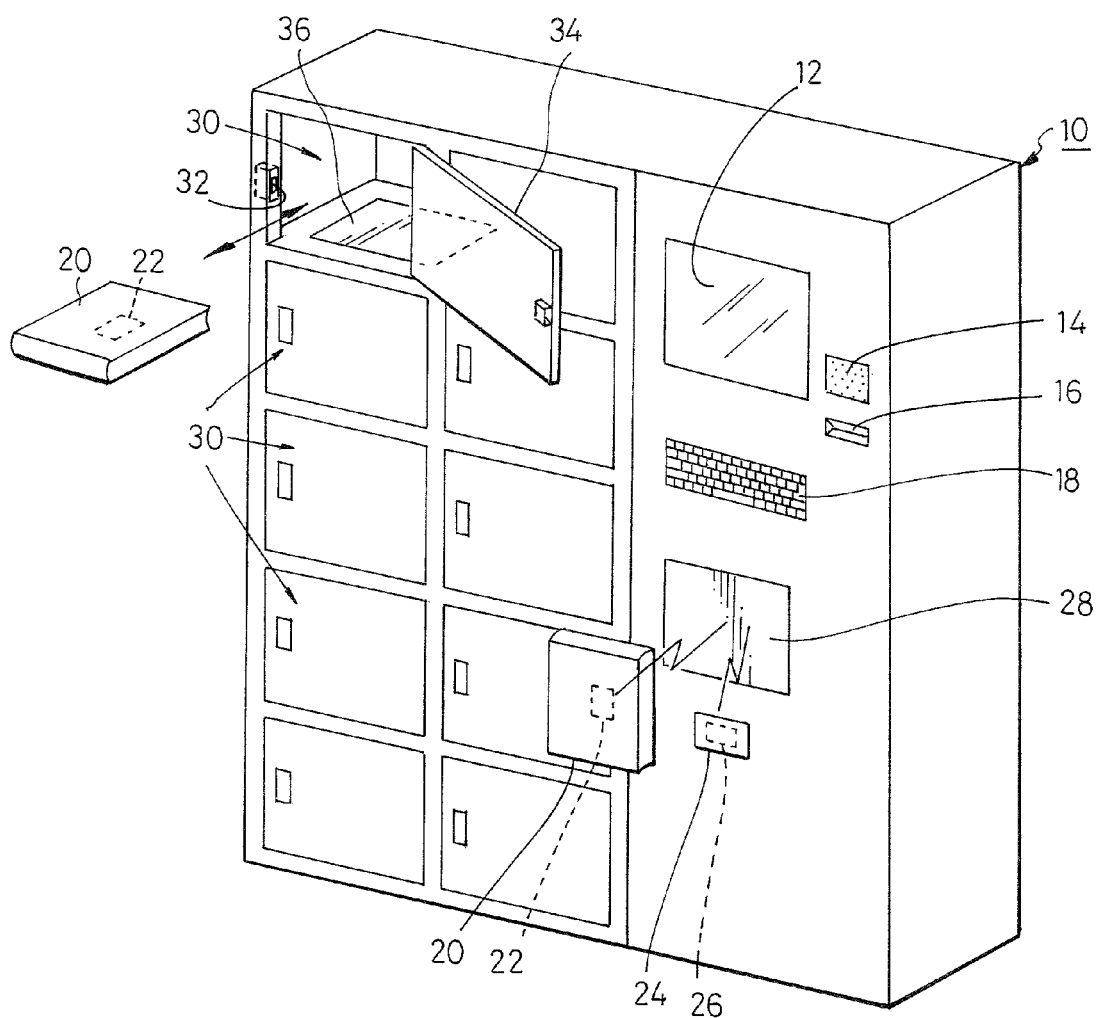
FIG. 1 is a view schematically showing an example of a system for handling scheduled lending and self-returning of articles according to the present invention.
Figure 2:
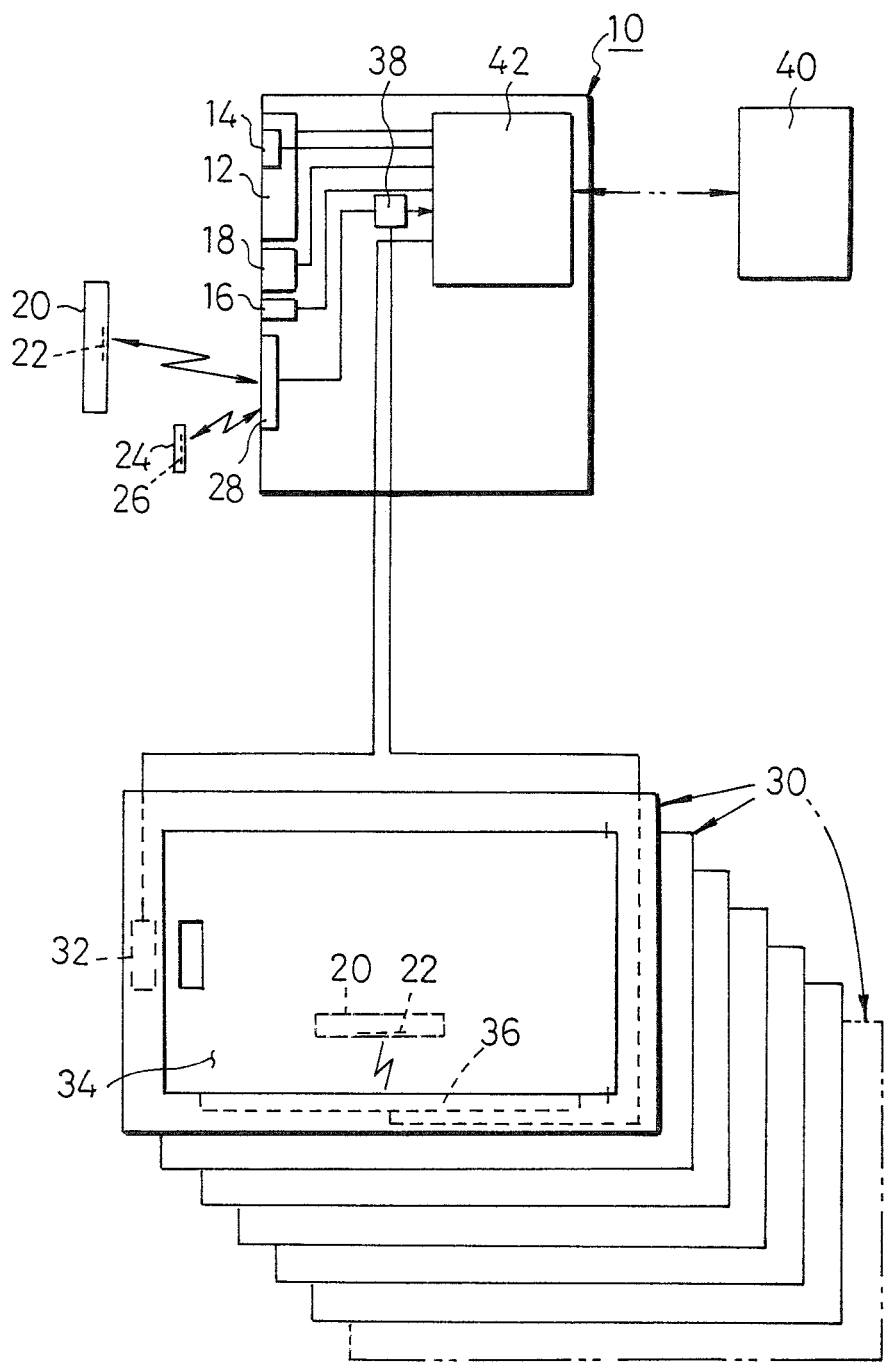
FIG. 2 is a diagram systematically showing a structure of the system for handling scheduled lending and self-returning of articles according to the present invention.

As illustrated in FIGS. 1 and 2, a system for handling scheduled lending and self-returning of articles according to the present invention has a body 10. The body 10 includes, on one side of the front surface thereof, a display 12, such as a Liquid Crystal Display (LCD), for displaying a method of using the system according to the present invention, processes of handling scheduled lending and returning of articles, and processing results to an operator, such as, a staff, a librarian, or a user, a speaker 14, a receipt issuing unit 16, a manipulational information input unit 18, such as a keyboard, and an external antenna 28 for transmitting and receiving various information, such as an identification number and lending information, recorded in an RFID tag 22 attached to the article 20 scheduled to be lent or to be self-returned, and transmitting and receiving user information recorded in the RFID chip 26 of a user's lending card 24.

A plurality of article depositories 30 for providing spaces necessary to store or return the articles 20 is provided on the other side of the front surface of the body 10.

Each of the article depositories 30 includes a door 34, which is selectively locked and unlocked by a locking unit 32 that operates in response to electric signals. Each of the article depositories 30 is equipped with an internal antenna 36 for transmitting and receiving various information, such as the identification number or lending information of an article, recorded in the RFID tag 22 attached to the corresponding article 20, so that it is possible to detect the validity of the deposit, lending, and returning of the article 20 and the state of the deposit, lending, and returning of the article 20 in real time, thereby effectively preventing errors of management or usage.

Furthermore, a reader 38 and a controller 42 are provided inside the body 10. The reader 38 is connected to the external antenna 28 provided on the front surface of the body 10 and the internal antennas 36 installed in the article depositories 30, and reads information recorded in the RFID tags 22 of articles scheduled to be lent or to be self-returned, or information recorded in the RFID chips 26 of the user lending cards 24. The controller 42, such as a microprocessor or a Personal Computer (PC), checks the validity of deposit, lending, and returning by comparing information recorded in the RFID tags 22 or RFID chips 26, transmitted/received through the reader 38, and information input through the manipulational information input unit 18 with various article management information, including information about the lending schedule of articles stored in the database of a main computer 40 located in an article rental store, such as a library, archives, a video/DVD rental store, a baby carriage or toy rental store, and a tool rental store, and operates the locking units 32 of the article depositories 30, the display 12, the speaker 14, and the receipt issuing unit 16.

Figure 3:
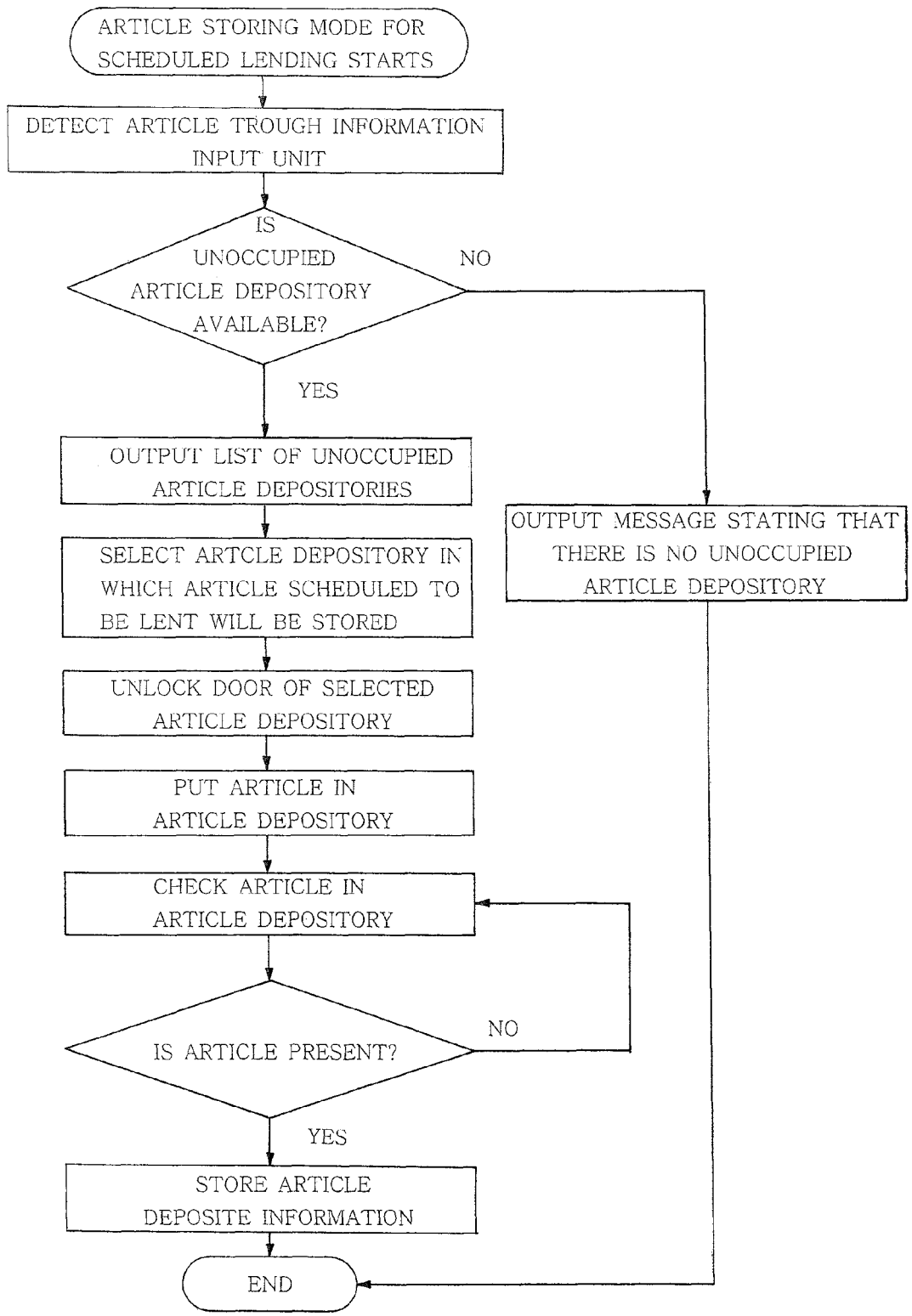
FIG. 3 is a flowchart showing the flow of the deposit of an article scheduled to be lent according to the system of the present invention.

As shown in FIGS. 1 and 2 and FIG. 3 which is a flowchart showing the flow of the deposit of an article scheduled to be lent, the system for handling scheduled lending and self-returning of articles according to the present invention, which is constructed as described above, is configured such that, when an article 20, to which an RFID tag 22 is attached and which will be stored, is brought near the external antenna 28 provided on the front surface of the body 10, the external antenna 28 and the reader 38 recognize and read information recorded in the RFID tag 22 of the article 20.

The controller 42, connected to the reader 38, first checks the validity of the deposit by comparing information about the lending schedule of articles stored in the database of the main computer 40 located in the article rental store with information input from the RFID tag 22 of the article 20 to be stored, checks if unoccupied article depositories exist, and provides notification of a list of unoccupied article depositories through the display 12 or the speaker 14.

Next, when an operator selects an article depository 30 using the manipulational information input unit 18, such as a keyboard, or the touch screen of the display 12, in consideration of the size or the weight of the article 20 to be stored, the locking unit 32 provided in the selected article depository 30 operates, and thus the door 34 is unlocked.

When the article 20 to be stored is placed in the selected article depository 30, the door 34 of which is unlocked, the internal antenna 36 provided in the article depository 30 detects the RFID tag 22 attached to the article 20 to be stored, thereby second confirming the validity of the deposit. Accurate information about the deposit of the article, validity of the deposit of which has been checked, is stored in the controller 42 through the reader 38 and in the database of the main computer 40 located in the article rental store, the locking unit 32 operates, and thus the door 34 of the corresponding article depository 30 is locked.

In this case, if the operator dose not put the article 20 to be stored in the designated article depository, or mistakenly puts an invalid article in the designated article depository, notification of information about a deposit error is provided to the operator through the display 12 or the speaker 14.

Therefore, it is possible to accurately perform the work of storing the article scheduled to be lent in the corresponding article depository without errors.

Figure 4:
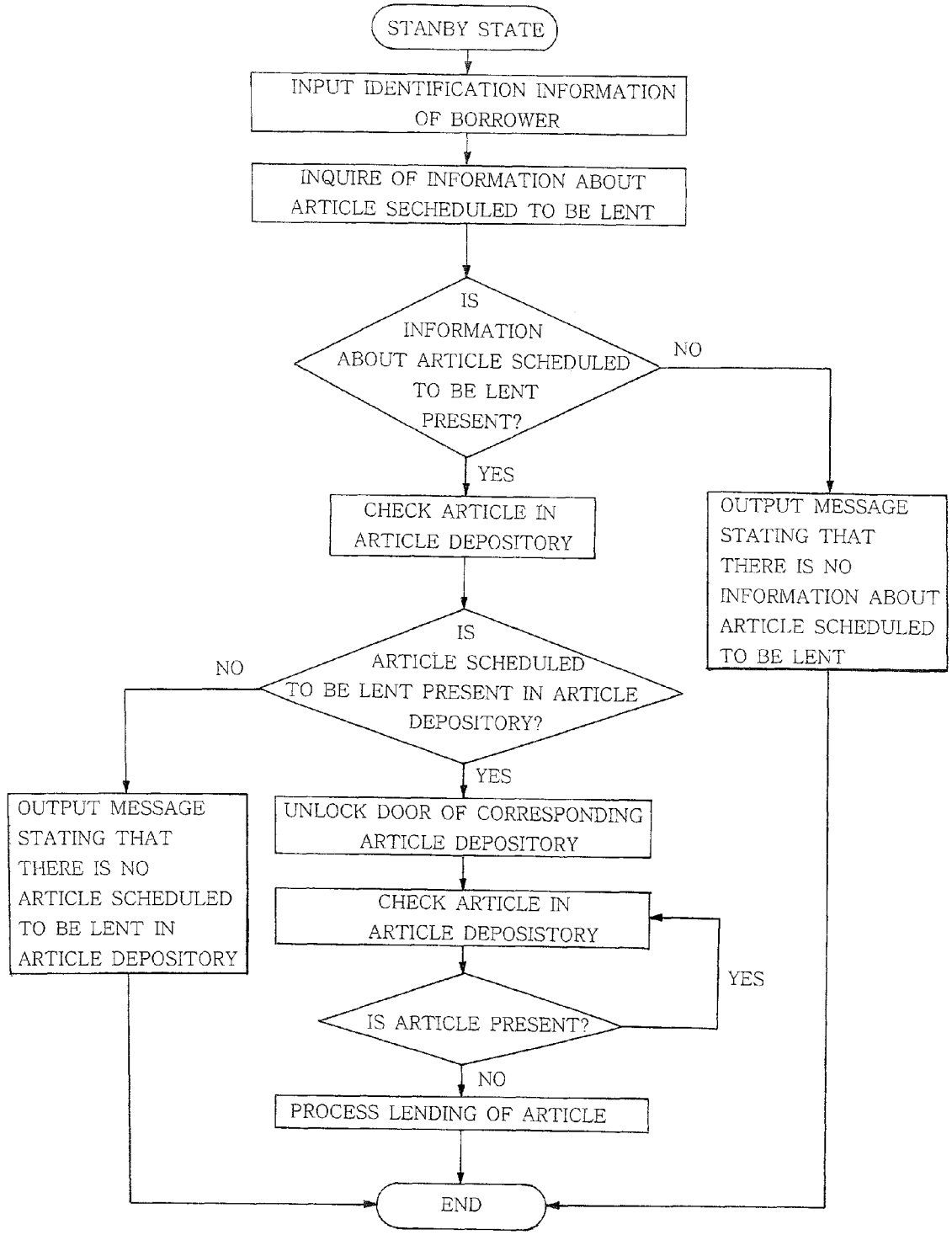
FIG. 4 is a flowchart showing the flow of the lending of an article scheduled to be lent according to the system of the present invention.

FIG. 4 is a flowchart showing the flow of the lending of an article scheduled to be lent.

A user, that is, a borrower, can borrow articles regardless of the business hours of rental stores.

In detail, the user may schedule the lending of an article via the website of a rental store or by phone in advance, and may take the article after the business hours of the rental store.

The flow of the lending of an article scheduled to be lent will be described in detail below. When the user inputs user identification information to the controller 42 using the manipulational information input unit 18, such as a keyboard, or inputs user identification information to the controller 42 through the reader 38 by bringing the user's lending card 24 near the external antenna 28, the controller 42 inquires about information about the lending schedule of articles from the main computer 40 located in the article rental store and checks whether the article 20 scheduled to be lent is present in the article depository 30.

Thereafter, the controller 42 causes the locking unit 32, provided in the corresponding article depository 30, to operate, so that the door 34 is unlocked and the borrower can borrow the article 20 scheduled to be lent.

At this time, the internal antenna 36 provided in the corresponding article depository 30 checks whether the borrower mistakenly leaves the article 20 scheduled to be lent in the opened article depository 30. Accurate information about the lending of an article, the validity of the lending of which has been checked, is stored in the controller 42 through the reader 38 and the database of the main computer 40 located in the rental store. Thereafter, notification of the fact that the article scheduled to be lent was normally lent is provided through the display 12 or the speaker 14, and a lending receipt is issued through the receipt issuing unit 16.

In the case, if the borrower mistakenly leaves the article 20 scheduled to be lent in the corresponding article depository 30, notification of the fact that the article scheduled to be lent was not normally lent is provided through the display 12 or the speaker 14.

Therefore, the borrower can accurately receive the article scheduled to be lent without errors.

Figure 5:
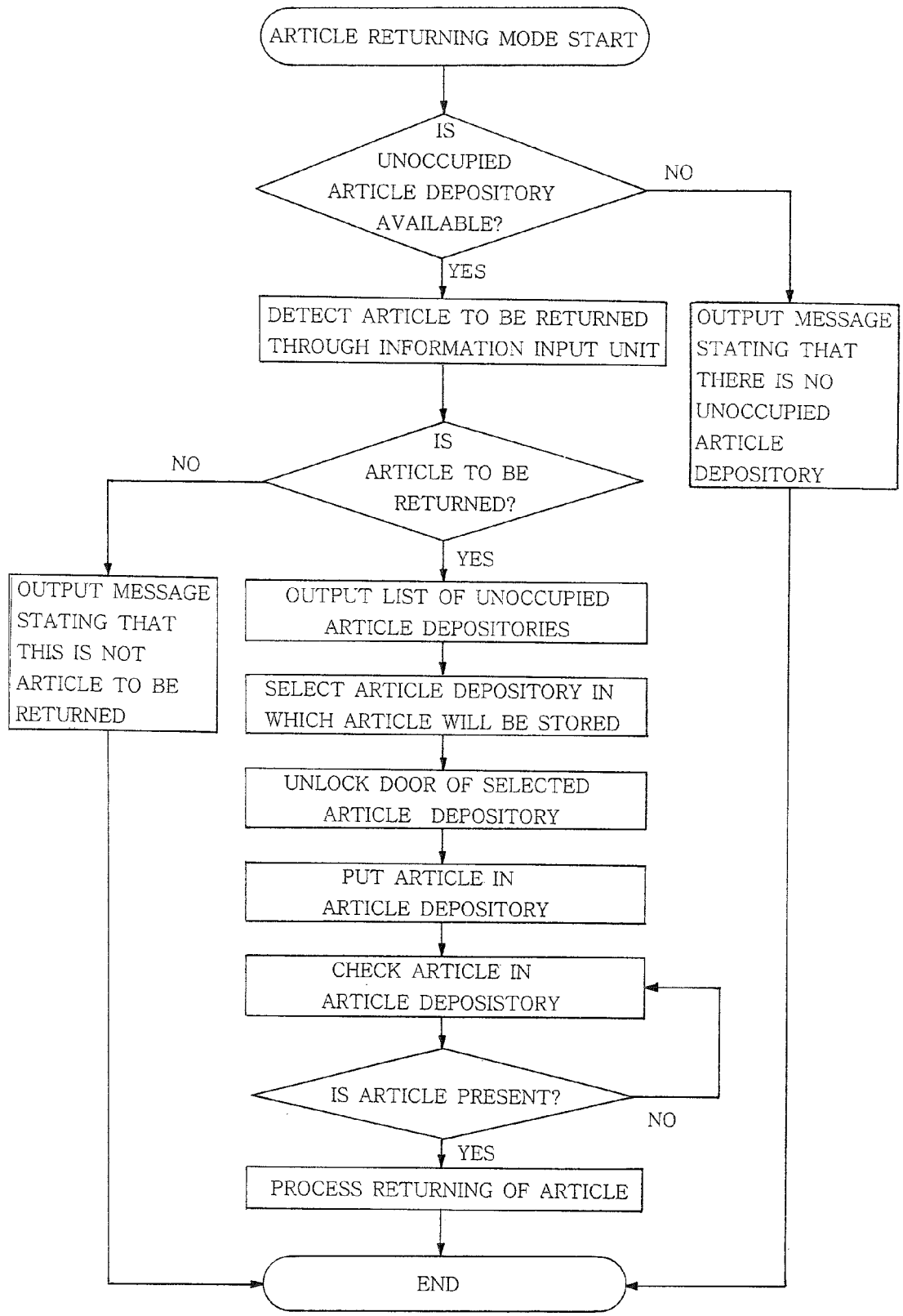
FIG. 5 is a flowchart showing the flow of the returning of a lent article according to the system of the present invention.

As shown in FIGS. 1 and 2 and FIG. 5 which is a flowchart showing the returning of the lent article, if the system is switched to a mode of retuning an article using the touch screen of the display 12 or the manipulational information input unit 18, such as a keyboard, it is first checked whether an unoccupied article depository is available.

In the state where an unoccupied article depository is available, if the article 20, to which the RFID tag 22 is attached, to be returned is brought near the external antenna 28, the external antenna 28 and the reader 38 detect and read information recorded in the RFID tag 22.

The controller 42, connected to the reader 38, first checks the validity of the returning by comparing the information about the lending of articles stored in the database of the main computer 40 located in the article rental store with the information input from the RFID tag 22 of the article 20 to be returned, and provides a list of unoccupied article depositories through the display 12 or the speaker 14.

When a user, returning an article, selects an article depository 30 to store an article 20 to be returned using the manipulational information input unit 18, such as a keyboard, or the touch screen of the display 12, the locking unit 32 provided in the selected article depository 30 operates, and thus the door 34 is unlocked.

Then, if the article 20 to be returned is put in the selected article depository 30, the door 34 of which is unlocked, the internal antenna 36 provided in the article depository 30 detects the RFID tag 22 attached to the article 20 to be returned and checks the validity of the returning second. Thereafter, accurate information about the returning of articles, the validity of the return of which is checked, is stored in the controller 42 through the reader 38 and the database of the main computer 40 located in the rental store, the locking unit 32 operates, and thus the door 34 of the corresponding article depository 30 is locked.

In addition, notification of the fact that the article 20 has been normally returned is provided through the display 12 or the speaker 14, and a returning receipt is output through the receipt issuing unit 16.

In this case, if the user, returning the article, does not put the article 20 to be returned in a designated article depository, or mistakenly puts the wrong article in the designated article depository, notification of a return error is provided to the user, returning the article, through the display 12 or the speaker 14 in real time.

Accordingly, it is possible to ensure that the article to be returned is accurately returned to the corresponding article depository without error.

Although, in the above-described present embodiment, only the system in which the single external antenna 28 is provided at the center of one side of the front surface of the body 10 is illustrated in the drawing, the position of the external antenna 28 may be modified or the number of external antennas 28 may be increased so as to ensure the easy accessibility of articles having various sizes or weights.

The present invention provides the system for handling the scheduled lending of articles, in which the external antenna for transmitting/receiving information to/from RFID tags attached to articles is provided on the front surface of the body and the internal antennas for transmitting/receiving information to/from RFID tags attached to articles are provided in respective article depositories arranged on the front surface of the body, so that it is possible to use the system without errors while accurately checking the states of storing and lending of the articles scheduled to be lent and self-returning of the lent articles in real time, thereby realizing excellent operational reliability and applicationability. Further, it is possible to borrow the articles scheduled to be lent regardless of business hours of the article rental store using the system for handling the scheduled lending of articles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for handling scheduled lending and self-returning of articles to which radio frequency identification (RFID) tags are attached, comprising a body;
   the body including, on a front surface thereof:
   a display for displaying a method of using the system, handling processes, and processing results;
   a speaker;
   a receipt issuing unit;
   a manipulational information input unit;
   an external antenna for transmitting/receiving information to/from the RFID tags, each of which is attached to a respective one of the articles; and
   a plurality of article depositories having respective internal antennas for transmitting/receiving information to/from the RFID tags; and
   the body including, on the inside thereof:
   a reader for reading the information recorded in the RFID tags through the external antenna and the internal antennas; and
   a controller for comparing information, transmitted/received to/from the reader, with article management information stored in the database of a main computer installed in an article rental store, checking validity of deposit, lending, and returning of the articles, and operating locking units of the article depositories, the display, the speaker, and the receipt issuing unit.

2. A system for handling scheduled lending and self-returning of articles to which radio frequency identification (RFID) tags are attached as defined in claim 1, wherein said controller is a personal computer.

3. A system for handling scheduled lending and self-returning of articles to which radio frequency identification (RFID) tags are attached as defined in claim 1, wherein said manipulational information input unit is a keyboard.

\* \* \* \* \*